United States Patent
Hada (10) Patent No.: US 12,406,467 B2
(45) Date of Patent: Sep. 2, 2025

(54) IMAGE CAPTURING APPARATUS CAPABLE OF SUPPRESSING DETECTION OF SUBJECT NOT INTENDED BY USER, CONTROL METHOD FOR IMAGE CAPTURING APPARATUS, AND STORAGE MEDIUM

(71) Applicant: CANON KABUSHIKI KAISHA, Tokyo (JP)

(72) Inventor: Tetsuya Hada, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 351 days.

(21) Appl. No.: 17/967,056

(22) Filed: Oct. 17, 2022

(65) Prior Publication Data

US 2023/0154148 A1     May 18, 2023

(30) Foreign Application Priority Data

Nov. 18, 2021   (JP) ................................ 2021-188047

(51) Int. Cl.
*G06V 10/74*     (2022.01)
*G06K 7/14*      (2006.01)
(Continued)

(52) U.S. Cl.
CPC ......... *G06V 10/761* (2022.01); *G06K 7/1417* (2013.01); *G06T 7/62* (2017.01);
(Continued)

(58) Field of Classification Search
CPC .... G06V 10/761; G06V 10/25; G06V 40/161; G06V 2201/07; G06T 7/62;
(Continued)

(56) References Cited

U.S. PATENT DOCUMENTS

2008/0170132 A1   7/2008   Yi et al.
2013/0258167 A1* 10/2013   Gum ................... H04N 23/675
                                                       348/E5.045

(Continued)

FOREIGN PATENT DOCUMENTS

JP     2007-318775 A     12/2007

OTHER PUBLICATIONS

Extended European Search Report issued Mar. 30, 2023, in European Patent Application No. 22202652.8 (11 pages).

(Continued)

*Primary Examiner* — Oneal R Mistry
*Assistant Examiner* — Nhut Huy Pham
(74) *Attorney, Agent, or Firm* — Venable LLP (57) ABSTRACT

An image capturing apparatus obtains an image, a first detecting unit detects a specific subject from the image, a second detecting unit detects an identifier from the image, a decoding unit obtains information indicated by the detected identifier, a comparing unit compares a distance from a center of the photographing view angle of the image to a region that the subject is detected and a distance from the center of the view angle to a region that the identifier is detected, or a comparison between a size of the region that the subject is detected and a size of the region that the identifier is detected. According to the comparison, a processing unit switches between displaying a screen that allows a user to select whether to execute processing based on the identifier indicated information, without automatic focus control, and performing the automatic focus control for the subject without screen display.

10 Claims, 7 Drawing Sheets

(51) Int. Cl.
  *G06T 7/62*   (2017.01)
  *G06V 10/25*  (2022.01)
  *G06V 40/16*  (2022.01)
(52) U.S. Cl.
  CPC ............ *G06V 10/25* (2022.01); *G06V 40/161* (2022.01); *G06T 2207/30201* (2013.01); *G06T 2207/30242* (2013.01); *G06V 2201/07* (2022.01)
(58) Field of Classification Search
  CPC ........... G06T 2207/30201; G06T 2207/30242; G06K 7/1417
  See application file for complete search history.

(56) References Cited

U.S. PATENT DOCUMENTS

| | | | |
|---|---|---|---|
| 2018/0063344 A1* | 3/2018 | Cho | H04N 23/635 |
| 2020/0026943 A1* | 1/2020 | Rodriguez | G06V 40/161 |
| 2020/0252541 A1 | 8/2020 | Song et al. | |

OTHER PUBLICATIONS

Indian Office Action issued Dec. 18, 2023, in corresponding Indian Patent Application No. 202244063068, with machine English translation (12 pages).

* cited by examiner

IMAGE CAPTURING APPARATUS CAPABLE OF SUPPRESSING DETECTION OF SUBJECT NOT INTENDED BY USER, CONTROL METHOD FOR IMAGE CAPTURING APPARATUS, AND STORAGE MEDIUM

CROSS-REFERENCE TO PRIORITY APPLICATION

This application claims the benefit of Japanese Patent Application No. 2021-188047, filed Nov. 18, 2021, which is hereby incorporated by reference herein in its entirety.

BACKGROUND OF THE INVENTION

Field of the Invention

The present invention relates to an image capturing apparatus, a control method for the image capturing apparatus, and a storage medium.

Description of the Related Art

In recent years, it has become possible to easily access web pages or detailed information by reading two-dimensional codes, which are optical code information printed on advertisements, instruction manuals, production management documents at factories, etc., with cameras mounted on smartphones, tablet PCs (Personal Computers), etc. Japanese Laid-Open Patent Publication (kokai) No. 2007-318775 has disclosed a technique that switches photographing procedures according to a subject such as a natural image or a two-dimensional code, and, when switching to two-dimensional code photographing, recognizes the two-dimensional code in a captured image. Furthermore, smartphones in recent years also have become capable of recognizing both a human face and a two-dimensional code.

However, in the technique disclosed in Japanese Laid-Open Patent Publication (kokai) No. 2007-318775, in the case of reading the two-dimensional code, it is necessary to change settings so as to change to a two-dimensional code photographing mode. In addition, in a normal photographing mode of the smartphone in recent years, when both the human face and the two-dimensional code are recognized, the two-dimensional code will be read even in the case that a user wants to photograph the human face. Therefore, in order to photograph the human face without recognizing the two-dimensional code, it is necessary to change to a portrait mode.

SUMMARY OF THE INVENTION

The present invention provides an image capturing apparatus capable of suppressing reading of a two-dimensional code not intended by a user when the two-dimensional code is present within a photographing angle of view (here after, simply referred to as "a photographing view angle") without taking time and labor for the user to operate, a control method for the image capturing apparatus, and a storage medium.

Accordingly, the present invention provides an image capturing apparatus comprising an obtaining unit configured to obtain an image, a first detecting unit configured to detect a specific subject from the image, a second detecting unit configured to detect an identifier from the image, a reading unit configured to read predetermined information from the identifier, and a processing unit configured to execute a processing based on the predetermined information, wherein the processing unit is configured to selectively execute the processing based on a distance from the center of a photographing view angle of the obtained image to a region that the specific subject is detected and a distance from the center of the photographing view angle of the obtained image to a region that the identifier is detected.

According to the present invention, when the two-dimensional code is present within the photographing view angle, it is possible to suppress reading of the two-dimensional code not intended by the user without taking time and labor for the user to operate.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Here, although a smartphone is taken as an example of an image capturing apparatus according to the present invention, the image capturing apparatus according to the present invention is not limited to the smartphone.

Figure 1A:
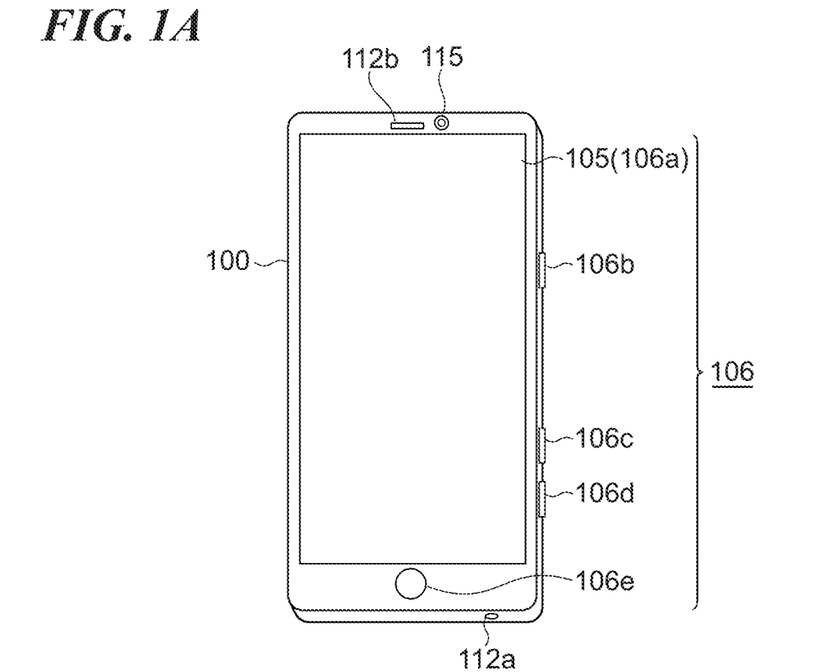
FIG. 1A is a front view that shows the appearance of a smartphone according to an embodiment of the present invention.
Figure 1B:
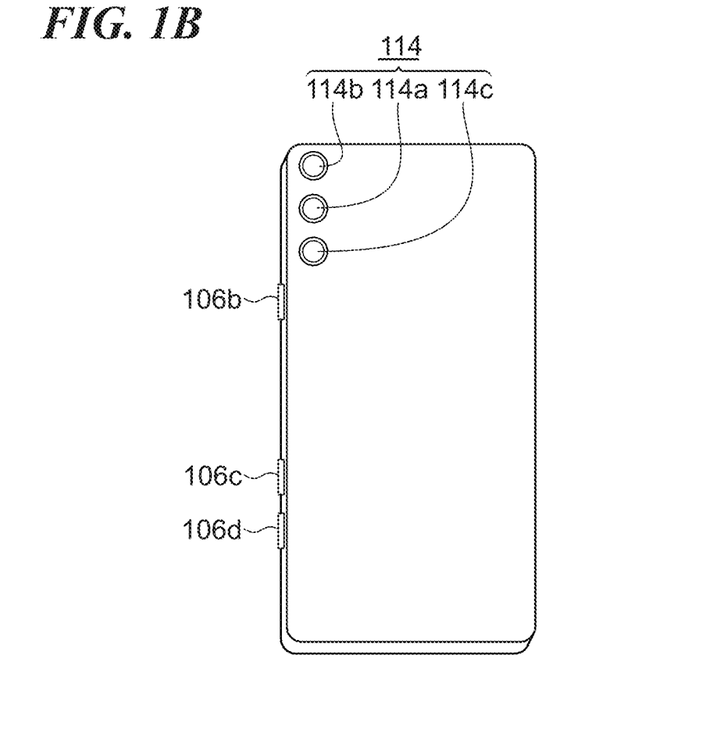
FIG. 1B is a rear view that shows the appearance of the smartphone according to the embodiment of the present invention.

FIG. 1A is a front view that shows the appearance of a smartphone 100 according to an embodiment of the present invention, and FIG. 1B is a rear view that shows the appearance of the smartphone 100.

A display 105, a touch panel 106a, a speaker 112b, a front camera 115, and a home button 106e are disposed on the front face (a first face) of the smartphone 100. It should be noted that the touch panel 106a is disposed so as to overlap the display 105.

An audio output terminal 112a is provided on the bottom face of the smartphone 100. A side face of the smartphone 100 is provided with a power button 106b, a volume up button 106c, and a volume down button 106d. A rear camera 114 is disposed on the rear face (a second face) of the smartphone 100. The rear camera 114 is a multi-lens camera that includes a telephoto camera 114a, a standard camera 114b, and a super wide angle camera 114c. It should be noted that the arrangement layout shown in FIG. 1B of the telephoto camera 114a, the standard camera 114b, and the super wide angle camera 114c in the rear camera 114 is an example, and the arrangement layout of the telephoto camera 114a, the standard camera 114b, and the super wide angle camera 114c in the rear camera 114 may be a different arrangement layout. Functions, and the like, of respective components included in the smartphone 100 will be described together with the description of a block diagram that shows a schematic configuration of the smartphone 100 shown in FIG. 2.

Figure 2:
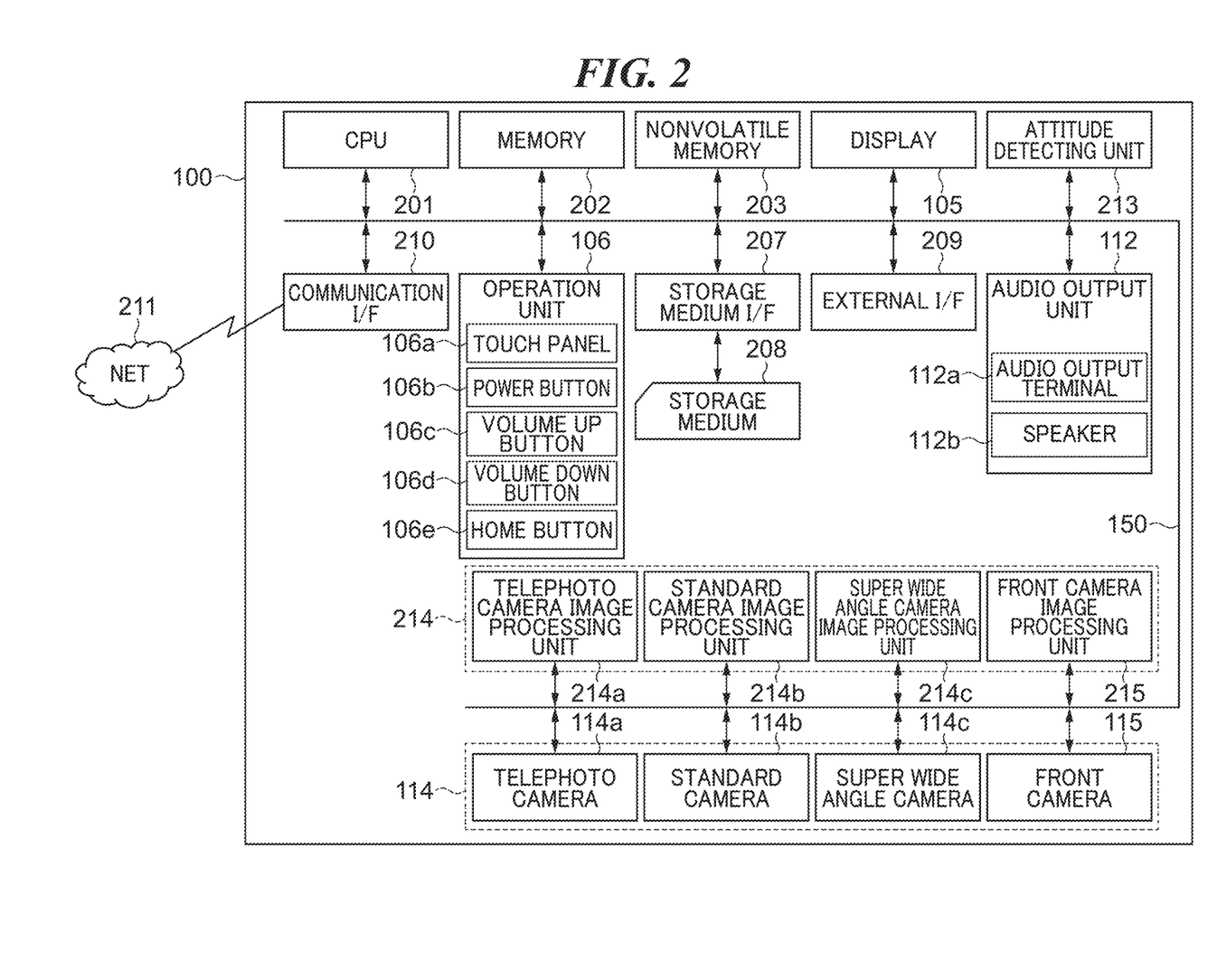
FIG. 2 is a block diagram that shows a schematic configuration of the smartphone according to the embodiment of the present invention.

FIG. 2 is the block diagram that shows the schematic configuration of the smartphone 100. The smartphone 100 includes a CPU (Central Processing Unit) 201, a memory 202, a nonvolatile memory 203, the display 105, an attitude detecting unit 213, an operation unit 106, a storage medium I/F (Interface) 207, an external I/F 209, a communication I/F 210, and an audio output unit 112. In addition, the smartphone 100 includes the rear camera 114, the front camera 115, a rear camera image processing unit 214, and a front camera image processing unit 215. The respective components included in the smartphone 100 is configured so as to be connected to an internal bus 150 and be able to exchange data with each other via the internal bus 150.

The CPU 201 is a control means for performing overall control of the smartphone 100, and is configured by at least one processor or circuit. The memory 202 is, for example, a RAM (Random Access Memory). The nonvolatile memory 203 stores image data, audio data, other data, various kinds of programs for the CPU 201 to work, etc. The nonvolatile memory 203 is configured by, for example, a flash memory or a ROM (Read Only Memory). The CPU 201 integrally controls operations of the respective components of the smartphone 100 by expanding the program, which is stored in the nonvolatile memory 203, on a working area of the memory 202.

The display 105 is a display device such as a liquid crystal display or an organic EL (Electro Luminescence) display. The display 105 displays a photographed image, a GUI (Graphical User Interface) screen, or the like, under the control of the CPU 201. For example, the CPU 201 generates display control signals according to the program, and controls the respective components of the smartphone 100 so as to generate image (video) signals for displaying predetermined information on the display 105, and to output them to the display 105. The display 105 displays a video on the basis of the image signals outputted from the respective components of the smartphone 100. In addition, an image (a live view image) being captured by the front camera 115 or the rear camera 114, which functions as an obtaining unit that obtains an image, is able to be displayed on the display 105. In other words, a user is able to perform photographing while checking the live view image displayed on the display 105.

The operation unit 106 includes the touch panel 106a, the power button 106b, the volume up button 106c, the volume down button 106d, and the home button 106e. The touch panel 106a is planarly configured so as to be superimposed on the display 105, detects a touch operation with respect to a display surface (an operation surface) of the display 105, and outputs the contact position of the touch operation to the CPU 201 as coordinate information. Further, a keyboard, an icon, or the like, displayed on the display 105 functions as the operation unit 106 by operating the touch panel 106a.

It should be noted that any type of touch panel among various types of touch panels, such as a resistive film type touch panel, an electrostatic capacitance type touch panel, a surface acoustic wave type touch panel, an infrared type touch panel, an electromagnetic induction type touch panel, an image recognition type touch panel, and an optical sensor type touch panel may be used as the touch panel 106a.

Further, the method of detecting a touch operation with respect to the touch panel 106a may be either a method (a contact type detection method) of detecting a touch operation based on actual contact (i.e., when there is actual contact, or a method (a non-contact type detection method) of detecting a touch operation based on an approach (i.e., when there is the approach).

The power button 106b is an operation means for switching lighting on/off of the display 105, and is also an operation means for switching power on/off of the smartphone 100 by being pressed down continuously for a certain amount of time (for example, three seconds), that is, by a so-called long press. The volume up button 106c and the volume down button 106d are operation means for adjusting the volume outputted from the audio output unit 112. When the volume up button 106c is pressed down, the output volume increases, and, when the volume down button 106d is pressed down, the output volume decreases. In addition, in a photographing standby state when using the camera, the volume up button 106c and the volume down button 106d function as shutter buttons for instructing photographing. It should be noted that the user of the smartphone 100 is able to set specific functions to be executable, to a simultaneous pressing operation of pressing down the power button 106b and the volume down button 106d at the same time, an operation of quickly pressing down the volume down button 106d several times, and other operations.

The home button 106e is an operation means that causes the display 105 to display a home screen, which is a startup screen of the smartphone 100. By pressing down the home button 106e when various applications have been activated and used on the smartphone 100, the user is able to temporarily close the various applications activated and to display the home screen. It should be noted that although the home button 106e is shown here as a button that is capable of be physically pressed down, it is not limited to this, and may be a button that is displayed on the display 105 and functions in the same way by a touch operation.

The audio output unit 112 includes the audio output terminal 112a and the speaker 112b. The speaker 112b outputs audio of moving images, audio of music data, operation sounds, ringtones, various kinds of notification sounds, and the like. The audio output terminal 112a is a terminal (a so-called headphone jack) that outputs audio signals to a headphone, an earphone, an external speaker, or the like. In the case that an audio output device such as a headphone is not connected to the audio output terminal 112a, audio is outputted from the speaker 112b. It should be noted that audio output may be performed by wireless communication, or the like, and, for example, the audio output to a speaker, an earphone (a headphone), or the like, by using Bluetooth (registered trademark) can be exemplified.

A storage medium 208 is, for example, a memory card attached to the main body of the smartphone 100 or an internal storage built into the smartphone 100. The storage medium I/F 207 is an interface for reading out data from the storage medium 208 and writing data into the storage medium 208 under the control of the CPU 201. The external I/F 209 is an interface for communicably connecting the smartphone 100 and an external device through a connection cable or by the wireless communication, and inputting/outputting video signals, the audio signals, and the like. The communication I/F 210 is an interface for connecting to a communication network such as the Internet 211.

The attitude detecting unit 213 detects the attitude of the smartphone 100 with respect to the direction of gravity, and the tilt and rotation of the smartphone 100 with respect to the yaw, roll, and pitch axes. Based on detection signals of the attitude detecting unit 213, it is possible to determine whether the smartphone 100 is held in a horizontal attitude or a vertical attitude, whether the surface of the display 105 is facing upward or downward, whether it is in an oblique attitude, and the like. At least one of an acceleration sensor, a gyro sensor, a geomagnetic sensor, an azimuth sensor, an altitude sensor, and the like, can be used as the attitude detecting unit 213, and a plurality of sensors may be used in combination as the attitude detecting unit 213.

In the rear camera 114, the telephoto camera 114*a*, the standard camera 114*b*, and the super wide angle camera 114*c* are each provided with a lens and an imaging sensor (an image capturing element). The focal length of the telephoto camera 114*a* is longer than the focal length of the standard camera 114*b*, and, by using the telephoto camera 114*a*, it is possible to magnify and to photograph a farther subject than when using the standard camera 114*b*. Furthermore, the focal length of the super wide angle camera 114*c* is shorter than the focal length of the standard camera 114*b*. Therefore, by using the super wide angle camera 114*c*, it is possible to photograph a wider range than when using the standard camera 114*b*. In other words, the telephoto camera 114*a*, the standard camera 114*b*, and the super wide angle camera 114*c* have shorter focal lengths in this order, and, accordingly, wider photographing view angles. The front camera 115 includes, for example, a zoom lens with a focal length corresponding to that of the standard camera 114*b*.

In the embodiment of the present invention, the telephoto camera 114*a*, the standard camera 114*b*, and the super wide angle camera 114*c* are each provided with a lens with a mechanism that is optically magnified to a predetermined magnification. However, the telephoto camera 114*a*, the standard camera 114*b*, and the super wide angle camera 114*c* are not limited to this. The telephoto camera 114*a*, the standard camera 114*b*, and the super wide angle camera 114*c* may have a zoom function that is capable of continuously changing the photographing view angle between the telephoto side and the wide angle side, or may be provided with a mechanism that allows the user to change the magnification.

It should be noted that the telephoto camera 114*a*, the standard camera 114*b*, and the super wide angle camera 114*c* are able to perform photographing operations (image capturing operations) at the same time. Further, two cameras selected by the user from the telephoto camera 114*a*, the standard camera 114*b*, and the super wide angle camera 114*c* are also able to perform the photographing operations at the same time. Moreover, only one camera selected by the user from the telephoto camera 114*a*, the standard camera 114*b*, and the super wide angle camera 114*c* is also able to perform the photographing operation.

Both the live view image obtained through the rear camera 114 and the live view image obtained through the front camera 115 can be displayed on the display 105. At that time, by operating the touch panel 106*a*, it is possible to select a video to be displayed on the display 105 that is photographed (captured) by which lens (by which camera). For example, if the telephoto camera 114*a* is selected, it is possible to display a video, which is magnified more than the standard camera 114*b*, on the display 105. Further, if the standard camera 114*b* is selected, it is possible to display a video, which has a wider angle than the telephoto camera 114*a* and is magnified more than the super wide angle camera 114*c*, on the display 105. Furthermore, if the super wide angle camera 114*c* is selected, it is possible to display a video, which has a wider angle than both the telephoto camera 114*a* and the standard camera 114*b*, on the display 105. It should be noted that, in general, the rear camera 114 is often used to photograph (capture) a scene in front of the user's eyes, and the front camera 115 is often used to photograph (capture) the user (a photographer) himself/herself, that is, is often used to take a so-called selfie.

Under the control of the CPU 201, the front camera image processing unit 215 performs various kinds of image processing and a subject recognition processing with respect to the image (the video) photographed (captured) by the front camera 115. Under the control of the CPU 201, the rear camera image processing unit 214 performs the various kinds of image processing and the subject recognition processing with respect to the image (the video) photographed (captured) by the rear camera 114. Furthermore, the rear camera image processing unit 214 performs a decoding processing that is a series of processes of detecting the characteristics of a two-dimensional code, which will be described later, and judging whether or not they exist, and then obtaining information associated with the two-dimensional code. The decoding processing will be described together with the description of a QR code (registered trademark) later. Moreover, in the embodiment of the present invention, although the two-dimensional code will be described as an example, the present invention is not limited to this, and may be a one-dimensional code, a pattern, or the like as long as it is a graphic image that represents an identifier.

The rear camera image processing unit 214 includes a telephoto camera image processing unit 214*a*, a standard camera image processing unit 214*b*, and a super wide angle camera image processing unit 214*c*. The telephoto camera image processing unit 214*a* performs the processing with respect to the image photographed (captured) through the telephoto camera 114*a*. Similarly, the standard camera image processing unit 214*b* performs the processing with respect to the image photographed (captured) through the standard camera 114*b*, and the super wide angle camera image processing unit 214*c* performs the processing with respect to the image photographed (captured) through the super wide angle camera 114*c*.

Moreover, in the embodiment of the present invention, although the camera image processing unit corresponding to each of the three lenses (the three cameras) of the rear camera 114 is provided, the present invention is not limited to this configuration. For example, one camera image processing unit may be provided for the two lenses (the two cameras) out of the three lenses (the three cameras), and one camera image processing unit may be provided for the remaining one lens (the remaining one camera). Alternatively, one camera image processing unit may be provided for the three lenses (the three cameras).

The rear camera image processing unit 214 and the front camera image processing unit 215 are also able to perform the various kinds of image processing with respect to the image stored in the nonvolatile memory 203 or the storage medium 208, the video signals obtained via the external I/F 209, the image obtained via the communication I/F 210, or the like. The various kinds of image processing performed by the rear camera image processing unit 214 and the front camera image processing unit 215 includes an A/D (analog-to-digital) conversion processing, a D/A (digital-to-analog) conversion processing, an image data encoding processing, a compression processing, the decoding processing, an enlargement/reduction processing (a resizing processing), a noise reduction processing, a color conversion processing, and the like.

It should be noted that the rear camera image processing unit 214 and the front camera image processing unit 215 may each be configured by a dedicated circuit block for performing a specific image processing. On the other hand, the rear camera image processing unit 214 and the front camera image processing unit 215 may be integrated into one processing block, and may be configured so as to handle the videos obtained through the respective lenses (the respective cameras) by a parallel processing or a time division processing. Further, depending on the type of the image processing, instead of the rear camera image processing unit 214 and the front camera image processing unit 215, the CPU 201 is also able to perform the image processing according to the program.

Here, the two-dimensional code will be described. The two-dimensional code is a code having a display method that has information in horizontal and vertical directions. Further, the one-dimensional code (for example, a bar code) is a code that has information only in the horizontal direction. The two-dimensional codes include matrix type two-dimensional codes and stack type two-dimensional codes, the QR code is a typical matrix type two-dimensional code, and a PDF417 is a typical stack type two-dimensional code. The two-dimensional code is able to have more information than the one-dimensional code, and, in particular, the QR code is able to store not only numbers, but also, multilingual data such as alphabetical characters and Chinese characters. In addition, unlike other two-dimensional codes, the QR code does not require a dedicated reading device, and it is possible to read a QR code by using a camera (a digital camera) provided in a mobile phone, a smart phone, or the like. It should be noted that "reading a QR code" refers to a processing of detecting a QR code from an image obtained by the camera, performing the decoding processing described later, and displaying the result of the decoding processing on the display 105.

In recent years, QR codes have been actively printed and displayed on advertisements, instruction manuals, etc. (including not only paper media, but also, digital media, etc.). For example, by reading a QR code, the user is able to easily access a web page associated with the QR code and to obtain information. At that time, even in the case that a part of the QR code cannot be read or in the case that the QR code is read by mistake, since a redundant code for correcting the error is added to the QR code, the QR code is resistant to dirt and to distortion. Taking advantage of this feature, the QR codes are also widely used for production line management, and the like, at production sites such as manufacturing factories.

Furthermore, as electronic payments are expanding in place of a cash payment, as one of the electronic payments, the use of a so-called QR code payment, in which a QR code is read by a smartphone (an electronic information terminal), is increasing. Therefore, the side of the electronic information terminal is required to have technical support so that the QR code can be read smoothly during the QR code payment.

A QR code is a pattern image (a symbol, for example, see FIGS. 3A, 3B, 3C, 3D, 3E, and 3F) whose entirety is a substantially square formed by arranging cells, which are small squares, vertically and horizontally. An encoding processing is performed with respect to various marks such as numbers, alphabetical characters, and Chinese characters, and a QR code is generated by combining the cells and their arrays. It should be noted that currently, there are QR codes with the number of vertical cells×the number of horizontal cells ranging from twenty-one cells×twenty-one cells to one-hundred seventy-seven cells×One-hundred seventy-seven cells in increments of four cells. As the number of the cells increases, more information can be stored in (held by) the QR code.

Patterns called cut-out symbols are arranged at the three corners of the QR code symbol, and a camera application installed in a smartphone, or the like, recognizes the QR code by detecting the cut-out symbols from an image being captured. Specifically, the camera application detects the cut-out symbols from the image being captured, and detects the size of the QR code based on the detected cut-out symbols. The camera application detects the distribution pattern of the cells within the size of the QR code, which is detected, and deciphers the detected distribution pattern to read the information held by the QR code. A series of processes of detecting the cut-out symbols from the photographed image, detecting the distribution pattern of the cells, and reading the information is called the decoding processing.

In the smartphone 100, based on the cut-out symbols, the CPU 201 performs not only the recognition of the QR code and the size detection of the QR code, but also, the detection of tilt and distortion of the QR code. In addition, the CPU 201 judges whether or not the QR code is within a photographing range (an image capturing range) by recognizing the cut-out symbols.

It should be noted that, in order to correctly read the information contained in the QR code, it is necessary to accurately photograph (capture) the distribution pattern formed by the cells of the QR code. However, in the case of photographing (capturing) the QR code by using the smartphone 100, sometimes it is not possible to accurately recognize the distribution pattern of the cells due to reasons such as the camera (generally the rear camera 114) of the smartphone 100 and the QR code being too far away or the photographing location being dark. In this case, since a situation, in which it is not possible to perform the decoding processing with respect to the QR code and it is not possible to correctly read the information from the QR code, may occur, it is necessary to clearly and accurately photograph (capture) the distribution pattern of the cells, and to obtain the captured image.

A first embodiment will be described. In the first embodiment, in the case that a specific subject and a two-dimensional code are present within a photographing view angle of the smartphone 100, a control method that automatically judges whether or not to read the two-dimensional code based on the position of the specific subject and the position of the two-dimensional code will be described. It should be noted that, in the embodiment of the present invention, the front camera image processing unit 215 or the rear camera image processing unit 214 functions as a first detecting unit that detects a specific subject from an image. Further, the front camera image processing unit 215 or the rear camera image processing unit 214 also functions as a second detecting unit that detects an identifier from the image. Moreover, the CPU 201 functions as a reading unit that reads predetermined information from the identifier, a processing unit that executes a processing based on the predetermined information, a comparing unit, and a control unit.

In each control method according to not only the first embodiment, but also, a second embodiment and a third embodiment described later, in the case that a two-dimensional code (specifically, a QR code) is present within the image capturing range, it is assumed that the two-dimensional code can be photographed (captured) without any problem. Further, as an example, the specific subject is assumed to be a human face. It should be noted that the two-dimensional code is an example of the identifier. Examples of the case that the specific subject and the two-dimensional code are present within the photographing view angle include photographed images, etc., obtained at the time of photographing posters, instruction manuals, or the like. In that case, since the rear camera 114 is generally used, it is assumed here that the image capturing (the photographing) is performed by the standard camera 114b. However, instead of the standard camera 114b, the telephoto camera 114a or the super wide angle camera 114c may be used.

FIGS. 3A, 3B, 3C, 3D, 3E, and 3F are views that show image display examples that are displayed on the display 105 at the time of the image capturing performed by the rear camera 14. Details of the image display examples of FIGS. 3A, 3B, 3C, 3D, 3E, and 3F will be described as appropriate when flowcharts of FIGS. 4 to 6 are described.

Figure 4:
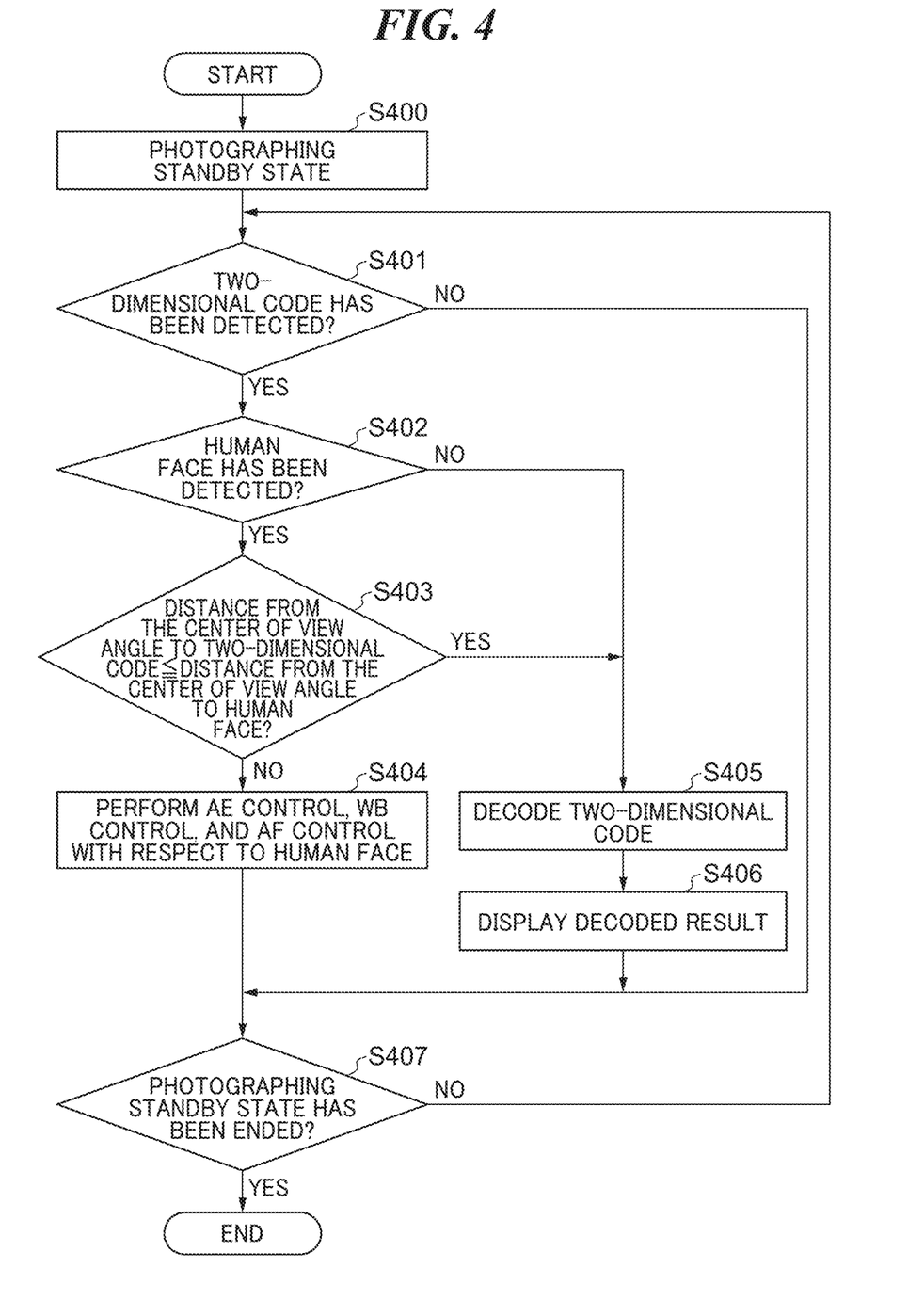
FIG. 4 is a flowchart that shows operation control according to a first embodiment of the smartphone.

FIG. 4 is the flowchart that shows operation control according to the first embodiment of the smartphone 100. Each processing (step), which is indicated by an S number in the flowchart of FIG. 4, is realized by the CPU 201 expanding the predetermined program, which is stored in the nonvolatile memory 203, on the memory 202 and integrally controlling the operations of the respective components of the smartphone 100.

First, a camera application is activated on the smartphone 100, and, in S400, the CPU 201 drives the standard camera 114b to obtain a photographed image (a live view image), and enters the photographing standby state. However, it is not limited to the camera application, and may be the photographing standby state when a two-dimensional code reading function of an application for performing the decoding processing with respect to the two-dimensional code is activated.

In S401, the CPU 201 judges whether or not a subject that looks like an optical code image (that is, a two-dimensional code) has been detected from the photographed image by the standard camera image processing unit 214b. In the case that the CPU 201 judges that the subject that looks like the two-dimensional code has not been detected (NO in S401), the CPU 201 advances the processing to S407. On the other hand, in the case that the CPU 201 judges that the subject that looks like the two-dimensional code has been detected (YES in S401), the CPU 201 advances the processing to S402.

In S402, the CPU 201 judges whether or not a human face has been detected from the photographed image by the standard camera image processing unit 214b. In the case that the CPU 201 judges that the human face has been detected (YES in S402), the CPU 201 advances the processing to S403.

In S403, the CPU 201 compares the position of the two-dimensional code detected in S401 with the position of the human face detected in S402, and judges whether or not a distance from the center of the photographing view angle to the human face is equal to or longer than a distance from the center of the photographing view angle to the two-dimensional code. In the case that the CPU 201 judges that the distance from the center of the photographing view angle to the human face is shorter than the distance from the center of the photographing view angle to the two-dimensional code (NO in S403), the CPU 201 advances the processing to S404. It should be noted that, in the first embodiment, the CPU 201 compares a distance from the center of a region of the two-dimensional code (here after, simply referred to as "a two-dimensional code region") to the center of the photographing view angle with a distance from the center of a region of the human face (here after, simply referred to as "a human face region") to the center of the photographing view angle. However, the first embodiment is not limited to this, and, instead of the center of the two-dimensional code region and the center of the human face region, the judgement in S403 may be performed by comparing a distance from the farthest vertex from the center of the photographing view angle among the vertices of the two-dimensional code region to the center of the photographing view angle with a distance from the farthest vertex from the center of the photographing view angle among the vertices of the human face region to the center of the photographing view angle.

Figure 3A:
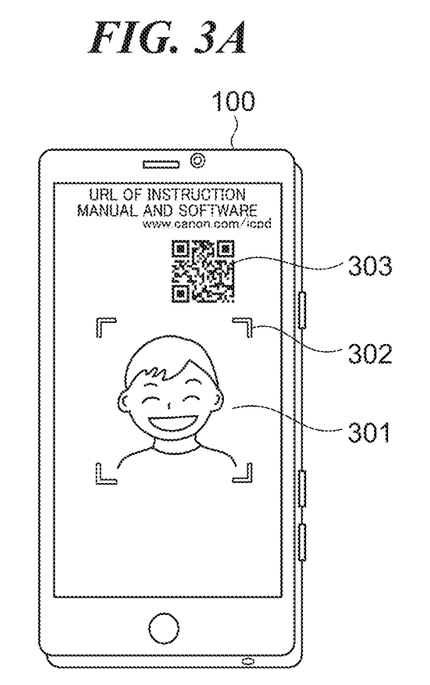
FIGS. 3A, 3B, 3C, 3D, 3E, and 3F are image display examples that are displayed on a display at the time of image capturing performed by a rear camera.

In S404, the CPU 201 performs various kinds of controls such as an AE (automatic exposure) control, a WB (white balance) control, and an AF (automatic focus) control with respect to the human face region detected in S402, and, then, advances the processing to S407. FIG. 3A shows the image display example displayed on the display 105 at the time of executing S404. As shown in FIG. 3A, since a face 301 is positioned closer to the center of the photographing view angle than a two-dimensional code 303, the CPU 201 displays a detection frame 302 with respect to the face 301. It should be noted that, while the processing proceeds from S404 to S407, a release processing that stores the photographed image as the image data may be performed, but the description thereof will be omitted.

In the case that the CPU 201 judges in S402 that the human face has not been detected (NO in S402), and, in the case that the CPU 201 judges in S403 that the distance from the center of the photographing view angle to the human face is equal to or longer than the distance from the center of the photographing view angle to the two-dimensional code (YES in S403), the CPU 201 advances the processing to S405.

Figure 3B:
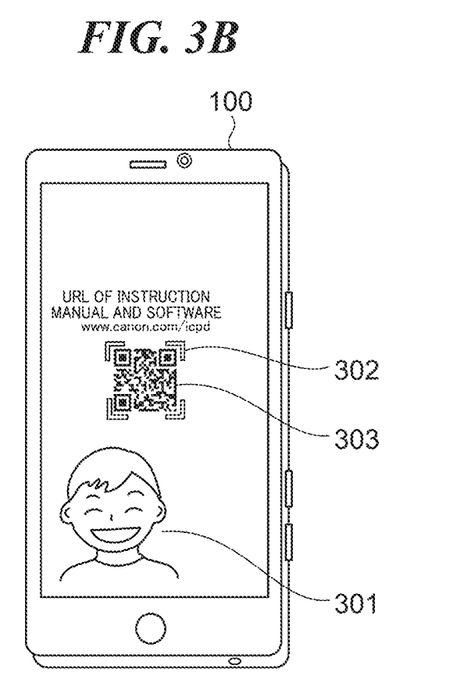

In S405, the CPU 201 performs the decoding processing to obtain information associated with the two-dimensional code, and then advances the processing to S406. FIG. 3B shows the image display example displayed on the display 105 at the time of executing S405. As shown in FIG. 3B, since the two-dimensional code 303 is positioned closer to the center of the photographing view angle than the face 301, the CPU 201 displays the detection frame 302 with respect to the two-dimensional code 303.

In S406, the CPU 201 executes a processing using the result obtained by the decoding processing in S405, that is, executes a processing using the information associated with the two-dimensional code. In the first embodiment, in the case that information associated with the two-dimensional code 303 is a URL indicating an access destination of a web page, the CPU 201 accesses the URL indicating the access destination of the web page according to a web browser application program and controls operation to display the web page on the screen of the display 105. Moreover, as with a dialog box 306 shown in FIG. 3C, the CPU 201 may display a URL associated with the two-dimensional code 303, access the URL associated with the two-dimensional code 303, and display a screen that asks the user whether or not to switch from the display of the live view image in the photographing standby state to the display of the web page. When the CPU 201 detects a touch on an "open" guide 304, the CPU 201 accesses the URL and performs control to display the web page on the display 105. On the other hand, when a touch on a "reobtain" guide 305 is detected, since it is often the case that the user does not want to switch to the display of the web page or the user wants to perform reading of the two-dimensional code again, the CPU 201 returns the smartphone 100 to the photographing standby state. As a result, the display of the display 105 returns to, for example, the screen shown in FIG. 3A.

Figure 3C:
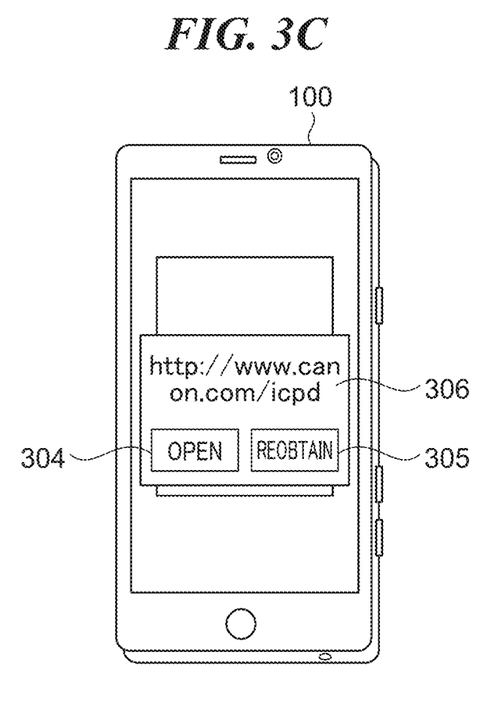

Moreover, in the first embodiment, the dialog box 306 is displayed as a confirmation screen for asking the user whether or not to access the URL or to switch to the display of the web page. On the other hand, after the two-dimensional code is read (after the decoding processing has been ended), a web page may be automatically opened and displayed on the display 105 by accessing a URL indicated by information held by the two-dimensional code without displaying the confirmation screen. Also, the user may be able to arbitrarily set whether to display the confirmation screen or quickly open the web page without displaying the confirmation screen. Furthermore, as the result of the decoding processing performed in S405, in the case that the two-dimensional code read holds text information or the like, instead of the URL, or the like, the text information held by the two-dimensional code is displayed in the dialog box 306.

In the embodiment of the present invention, although a configuration in which various kinds of information can be read by using an application capable of reading various kinds of two-dimensional codes has been described, a case of using an application that reads only a two-dimensional code holding specific information is also assumed. In the case of using an application capable of reading only a specific two-dimensional code, in the first place, even if a two-dimensional code other than the specific two-dimensional code enters the photographing view angle, the two-dimensional code other than the specific two-dimensional code may not be recognized, and, in this case, the photographing standby state is continued. On the other hand, even if the two-dimensional code is detected from the photographed image, in some cases, it is not possible to perform the decoding processing, and, in this case, it is desirable to display an error, which indicates that it is not possible to read, in the dialog box 306.

Further, in S406, as the processing using the information associated with the two-dimensional code, the CPU 201 may execute, for example, an accounting processing instead of the display of the web page. The CPU 201 controls operation to display information necessary for payment procedures on the screen of the display 105 according to an accounting application program. At this time, the information associated with the two-dimensional code 303 may indicate a store being a payment destination of a charge, or may indicate the type of a payment service provider and the accounting application program corresponding to the type of a payment service provider.

In S407, the CPU 201 judges whether or not the photographing standby state has been ended. Examples of the case of being judged that the photographing standby state has been ended include the case that an operation to end the camera application is performed, and the case that, as the result of the decoding processing performed in S405, the display on the display 105 shifts to a screen such as a web page other than a photographing standby screen.

In the case that the CPU 201 judges that the photographing standby state has not been ended (NO in S407), the CPU 201 returns the processing to S401. On the other hand, in the case that the CPU 201 judges that the photographing standby state has been ended (YES in S407), the CPU 201 ends the present processing (the operation control according to the first embodiment of the smartphone 100).

As described above, according to the first embodiment, in the case that a human being (here after, simply referred to as "a person") and a two-dimensional code are within the photographing view angle, priority is given to the one closer to the center of the photographing view angle, and the processing corresponding to the one closer to the center of the photographing view angle is executed. As a result, it is possible to prevent reading of the two-dimensional code not intended by the user from being performed, so that it becomes possible to perform comfortable photographing.

The second embodiment will be described. In the second embodiment, in the case that human face(s) and a two-dimensional code are present within the photographing view angle, a control method that automatically judges whether or not to read the two-dimensional code based on the number and the size of the human face(s) and the size of the two-dimensional code will be described.

Figure 5:
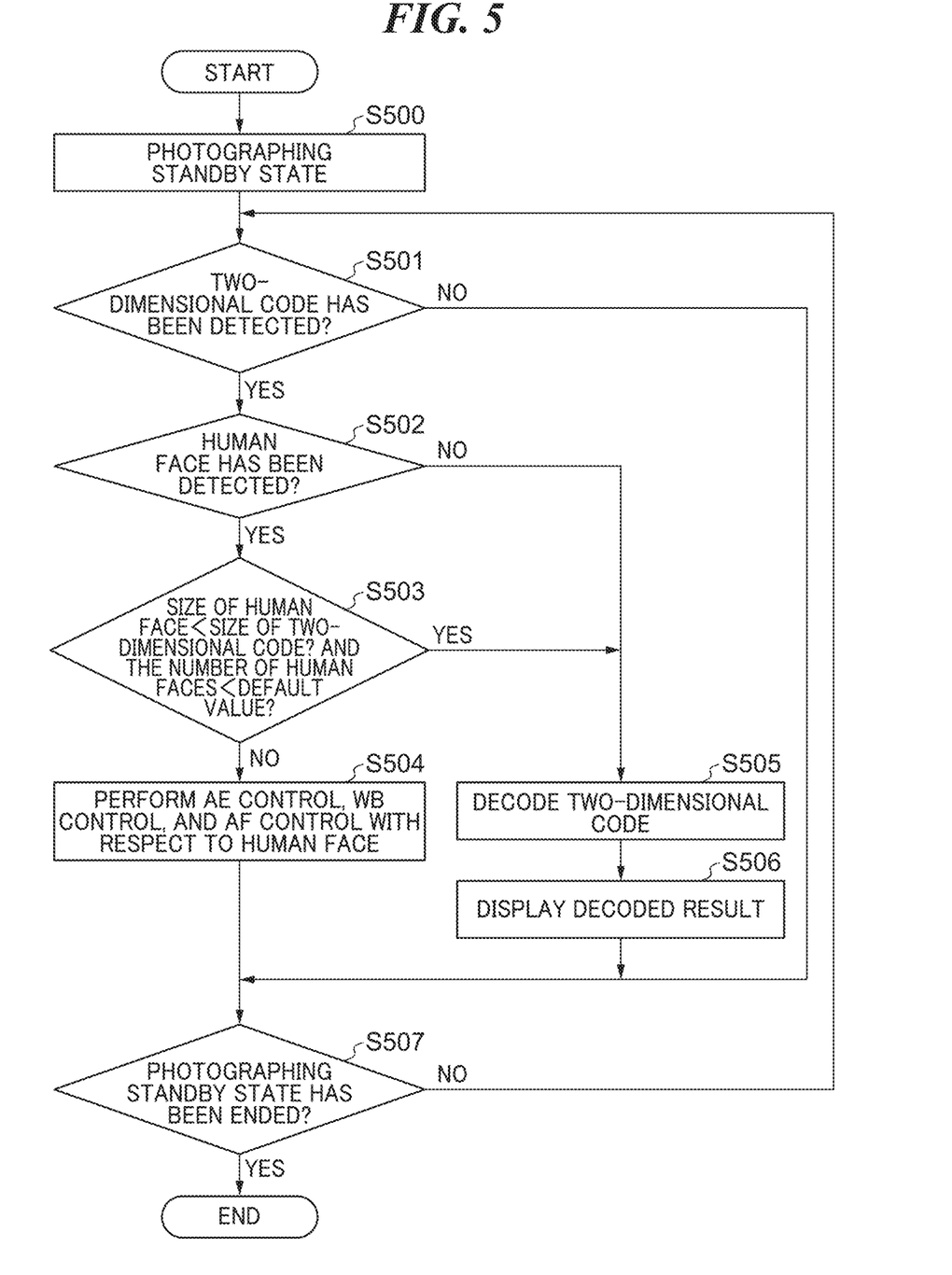
FIG. 5 is a flowchart that shows operation control according to a second embodiment of the smartphone.

FIG. 5 is the flowchart that shows operation control according to the second embodiment of the smartphone 100. Each processing (step), which is indicated by the S number in the flowchart of FIG. 5, is realized by the CPU 201 expanding the predetermined program, which is stored in the nonvolatile memory 203, on the memory 202 and integrally controlling the operations of the respective components of the smartphone 100.

Since the processes of S500 to S502 and S504 to S507 in the flowchart of FIG. 5 are the same as the processes of S400 to S402 and S404 to S407 in the flowchart of FIG. 4, descriptions thereof will be omitted.

In the case of being judged that the two-dimensional code and the human face(s) are present within the photographing view angle (YES in S501 and YES in S502), the CPU 201 advances the processing to S503. In S503, the CPU 201 judges whether or not the size (area) of the detected human face region is less than the size (area) of the detected two-dimensional code region, and whether or not the number of the detected human faces is less than a predetermined value (hereinafter, referred to as "a default value"). In the case that the CPU 201 judges that the size of the human face region is equal to or larger than the size of the two-dimensional code region, or that the number of the human faces is equal to or larger than the default value (NO in S503), the CPU 201 presumes that the user does not intend to read the two-dimensional code, and advances the processing to S504. On the other hand, in the case that the CPU 201 judges that the size of the human face region is less than the size of the two-dimensional code region, and that the number of the human faces is less than the default value (YES in S503), the CPU 201 presumes that the user intends to read the two-dimensional code, and advances the processing to S505.

Figure 3D:
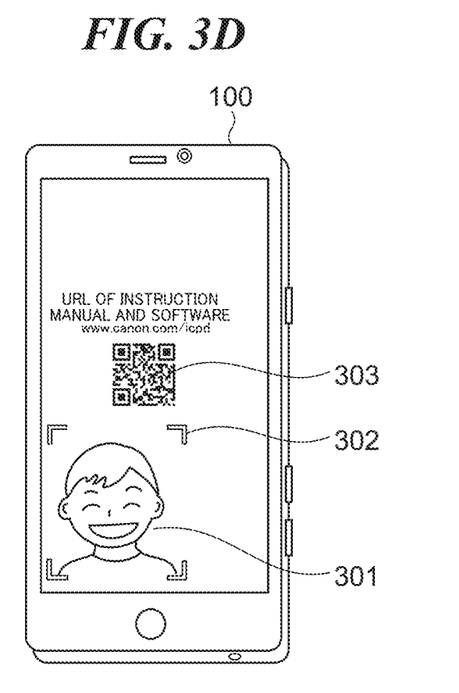
Figure 3E:
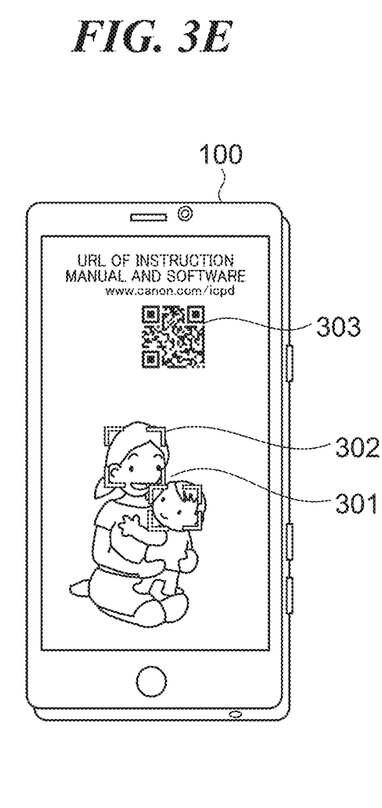

FIG. 3D shows the display example on the display 105 in the case that the size of the human face region is larger than the two-dimensional code, and FIG. 3E shows the display example on the display 105 in the case that the number of the detected human faces is larger than the default value (here, the default value=1). In these cases, reading of the two-dimensional code is not performed, and an image capturing preparation operation is performed in S504.

As described above, according to the second embodiment, in the case that persons and a two-dimensional code are within the photographing view angle, based on the results of comparison between the size and number of faces of the persons and the two-dimensional code, it is judged whether the user intends to photograph the persons or the user intends to read the two-dimensional code. As a result, it is possible to prevent reading of the two-dimensional code not intended by the user from being performed, so that it becomes possible to perform the comfortable photographing.

In addition, in the second embodiment, in the judgement of S503, by using two judgement conditions, a first judgement condition for comparing the size of the human face with the size of the two-dimensional code and a second judgement condition for comparing the number of the human faces with the default value, it is determined whether to perform image capturing (photographing) of the human face or to perform the decoding processing with respect to the two-dimensional code. In this case, the condition for proceeding to S504 becomes loose, while the condition for proceeding to S505 becomes strict. However, the second embodiment is not limited to this, whether to perform image capturing (photographing) of the human face or to perform the decoding processing with respect to the two-dimensional code may be determined only by the first judgement condition, or may be determined only by the second judgement condition.

Figure 6:
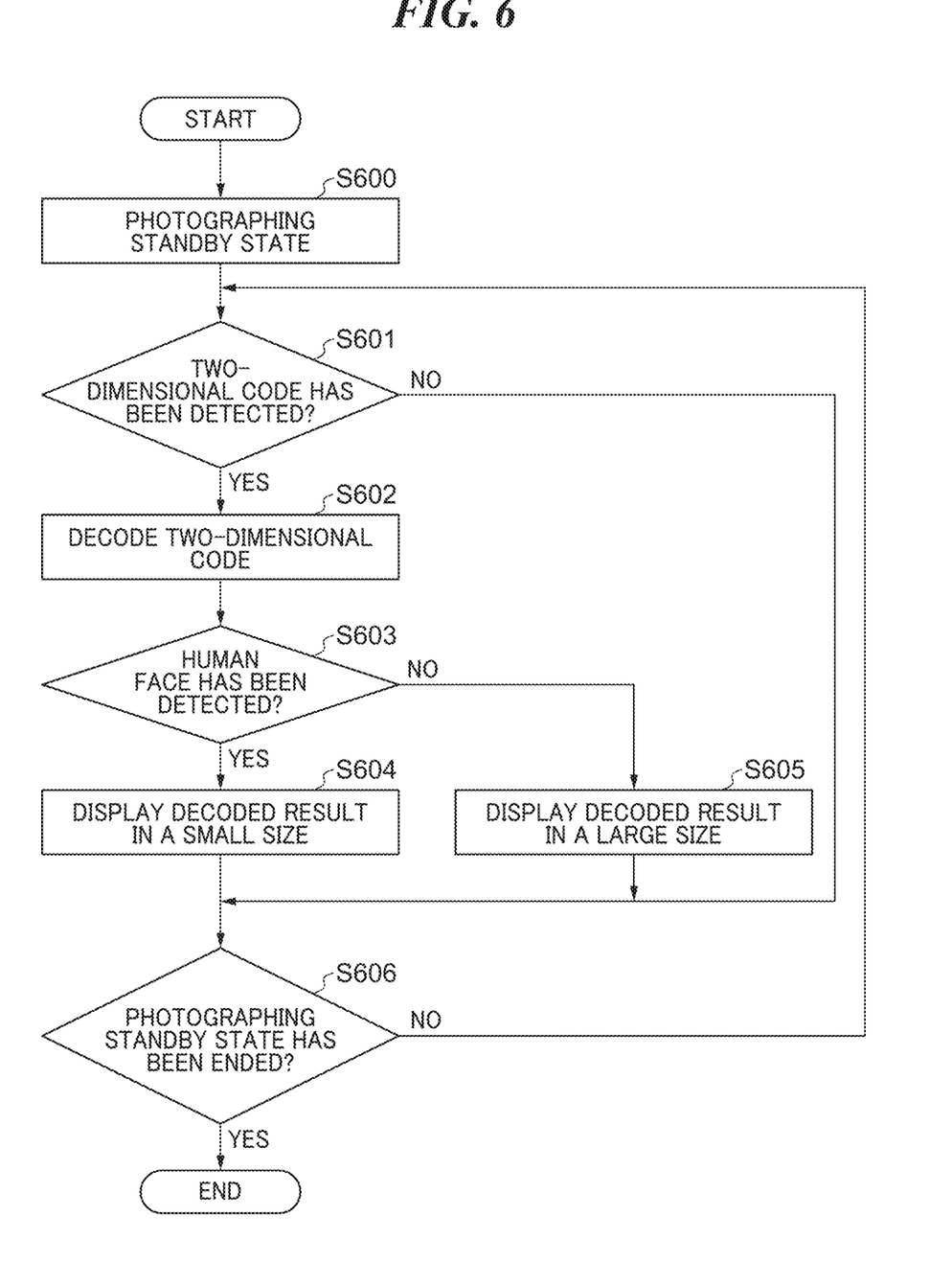
FIG. 6 is a flowchart that shows operation control according to a third embodiment of the smartphone.

The third embodiment will be described. In the third embodiment, in the case that a human face and a two-dimensional code are present within the photographing view angle, a control that reads the two-dimensional code and changes the display of a reading result of the two-dimensional code according to a detection result of the human face will be described. FIG. 6 is the flowchart that shows operation control according to the third embodiment of the smartphone 100. Each processing (step), which is indicated by the S number in the flowchart of FIG. 6, is realized by the CPU 201 expanding the predetermined program, which is stored in the nonvolatile memory 203, on the memory 202 and integrally controlling the operations of the respective components of the smartphone 100.

Since the processes of S600 to S603 and S606 in the flowchart of FIG. 6 are respectively the same as the processes of S400, S401, S405, S402 and S407 in the flowchart of FIG. 4, descriptions thereof will be omitted.

Figure 3F:
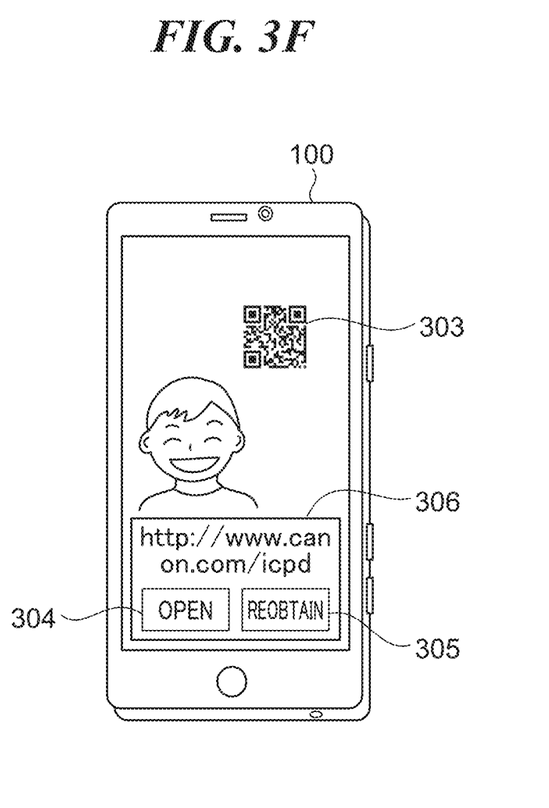

In the case that the CPU 201 judges in S603 that the human face is present within the photographing view angle (YES in S603), the CPU 201 advances the processing to S604. In S604, the CPU 201 displays the decoded result, which is obtained by performing the decoding processing in S602, on the display 105 in a small size, and, then, advances the processing to S606. FIG. 3F shows the display example on the display 105 in the case that the two-dimensional code is read and the human face is present within the photographing view angle. Moreover, although the decoded result is displayed in a small size on the display 105 here, the decoded result may be configured not to be displayed.

In the case that the CPU 201 judges in S603 that the human face is not present within the photographing view angle (NO in S603), the CPU 201 advances the processing to S605. In S605, the CPU 201 displays the decoded result, which is obtained by performing the decoding processing in S602, on the display 105 in a large size, and, then, advances the processing to S606. The display example on the display 105 in this case is similar to the display example shown in FIG. 3C.

As described above, according to the third embodiment, in the case that a person and a two-dimensional code are within the photographing view angle, by displaying the decoded result of the two-dimensional code in a small size, it is possible to prevent the user from losing sight of a main subject (the person) that the user wants to photograph even if reading of the two-dimensional code not intended by the user is performed, and, as a result, it becomes possible to perform the comfortable photographing.

Although the present invention has been described in detail based on its preferred embodiments, the present invention is not limited to these specific embodiments, and various embodiments without departing from the gist of the present invention are also included in the present invention. Furthermore, each embodiment described above merely shows one embodiment of the present invention, and it is also possible to combine each embodiment as appropriate.

For example, the smartphone 100 may have the judgement function of S403 in the first embodiment and the judgement function of S503 in the second embodiment. However, in that case, it is presumed that the judgement result of S403 and the judgement result of S503 may become reversed. For example, there is a case that the distance from the center of the photographing view angle to the two-dimensional code is short, but the size of the human face is larger than the two-dimensional code. Even in this case, it is possible to perform photographing (image capturing) of the specific subject or read the two-dimensional code by determining in advance which of the judgement in S403 and the judgement in S503 is to be prioritized as a default setting or by a user setting.

For example, in the above-described embodiments, the case that the present invention is applied to the smartphone 100 has been described, but the image capturing apparatus according to the present invention includes an electronic apparatus that includes a display and an image capturing means, and the present invention is able to be applied to, for example, a tablet PC, a PDA (Personal Digital Assistant), a digital camera, and the like. Needless to say, depending on the electronic apparatus to which the present invention can be applied, members, and the like, constituting an operation means for operating the electronic apparatus will have a different configuration from the operation unit 106 shown in FIG. 2. Further, as a configuration related to video output of the electronic apparatus according to the present invention, an external monitor may be used as the display (the display device), and an interface that outputs video signals to be displayed on the display may be provided.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or the apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image capturing apparatus comprising:
   at least one processor; and
   a memory storing instructions that, when executed by the at least one processor, causes the image capturing apparatus to function as:
   an obtaining unit configured to obtain an image;
   a first detecting unit configured to detect a specific subject from the image;
   a second detecting unit configured to detect an identifier from the image;
   a decoding unit configured to obtain information indicated by the identifier detected by the second detecting unit;
   a comparing unit configured to perform a comparison between a distance from a center of a photographing view angle of the obtained image to a region that the specific subject is detected and a distance from the center of the photographing view angle of the obtained image to a region that the identifier is detected, or a comparison between a size of the region that the specific subject is detected and a size of the region that the identifier is detected; and
   a processing unit configured to switch, according to a result of the comparison performed by the comparing unit, between displaying a screen that allows a user to select whether or not to execute processing based on the information indicated by the identifier without performing an automatic focus control for the specific subject, and performing the automatic focus control for the specific subject without displaying the screen.

2. The image capturing apparatus according to claim 1, wherein, in a case that the result of the comparison is that the distance from the center of the photographing view angle of the obtained image to the region that the specific subject is detected is equal to or longer than the distance from the center of the photographing view angle of the obtained image to the region that the identifier is detected, or that the size of the region that the specific subject is detected is less than the size of the region that the identifier is detected, the processing unit is further configured to display the screen that allows the user to select whether or not to execute the processing based on the information indicated by the identifier without performing the automatic focus control for the specific subject.

3. The image capturing apparatus according to claim 1, wherein, in a case that the result of the comparison is that the distance from the center of the photographing view angle of the obtained image to the region that the specific subject is detected is equal to or longer than the distance from the center of the photographing view angle of the obtained image to the region that the identifier is detected, or that the size of the region that the specific subject is detected is less than the size of the region that the identifier is detected, the decoding unit is further configured to obtain the information indicated by the identifier, and the processing unit is further configured to display, on the screen, the information indicated by the identifier.

4. The image capturing apparatus according to claim 1, wherein, in a case that the result of the comparison is that the distance from the center of the photographing view angle of the obtained image to the region that the specific subject is detected is shorter than the distance from the center of the photographing view angle of the obtained image to the region that the identifier is detected, or that the size of the region that the specific subject is detected is equal to or larger than the size of the region that the identifier is detected, the processing unit is further configured to perform the automatic focus control for the specific subject without displaying the screen that allows a user to select whether or not to execute the processing based on the information indicated by the identifier.

5. The image capturing apparatus according to claim 1, wherein the specific subject is a human face, and the identifier is a two-dimensional barcode.

6. A control method of controlling an image capturing apparatus, the method comprising:
   an obtaining step of obtaining an image;
   a first detecting step of detecting a specific subject from the image;
   a second detecting step of detecting an identifier from the image;
   a decoding step of obtaining information indicated by the detected identifier;
   a comparing step of performing a comparison between a distance from a center of a photographing view angle of the obtained image to a region that the specific subject is detected and a distance from the center of the photographing view angle of the obtained image to a region that the identifier is detected, or a comparison between a size of the region that the specific subject is detected and a size of the region that the identifier is detected; and
   a processing step of switching, according to a result of the comparison in the comparing step, between displaying a screen that allows a user to select whether or not to execute a processing based on the information indicated by the identifier without performing an automatic focus control for the specific subject, and performing the automatic focus control for the specific subject without displaying the screen.

7. A non-transitory computer-readable storage medium storing a program for causing a computer to execute a control method of controlling an image capturing apparatus, the method comprising:
   an obtaining step of obtaining an image;
   a first detecting step of detecting a specific subject from the image;
   a second detecting step of detecting an identifier from the image;
   a decoding step of obtaining information indicated by the detected identifier;
   a comparing step of performing a comparison between a distance from a center of a photographing view angle of the obtained image to a region that the specific subject is detected and a distance from the center of the photographing view angle of the obtained image to a region that the identifier is detected, or a comparison between a size of the region that the specific subject is detected and a size of the region that the identifier is detected; and a processing step of switching, according to a result of the comparison in the comparing step, between displaying a screen that allows a user to select whether or not to execute a processing based on the information indicated by the identifier without performing an automatic focus control for the specific subject, and performing the automatic focus control for the specific subject without displaying the screen.

8. The image capturing apparatus according to claim 1, wherein the processing unit is further configured to display, on the screen, a selection item for executing the processing based on the information indicated by the identifier and a selection item for reobtaining information indicated by the identifier by the decoding unit.

9. The image capturing apparatus according to claim 1, wherein the processing unit is further configured to display an automatic focus frame with respect to the specific subject in performing the automatic focus control for the specific subject.

10. The image capturing apparatus according to claim 2, wherein, in a case that the result of the comparison is that the distance from the center of the photographing view angle of the obtained image to the region that the specific subject is detected is equal to or longer than the distance from the center of the photographing view angle of the obtained image to the region that the identifier is detected, or that the size of the region that the specific subject is detected is less than the size of the region that the identifier is detected, the processing unit is further configured to perform the automatic focus control for the identifier without performing the automatic focus control for the specific subject, and to display the screen that allows a user to select whether or not to execute the processing based on the information indicated by the identifier.

* * * * *